US00RE36001E

United States Patent [19]

Siak et al.

[11] E Patent Number: Re. 36,001

[45] Reissued Date of Patent: Dec. 22, 1998

[54] SAND MOLD MEMBER AND METHOD

[75] Inventors: June-Sang Siak, Troy; William Thomas Whited, Saginaw; Mark Allen Datte, Auburn; Richard Michael Schreck, Bloomfield Hills, all of Mich.

[73] Assignee: General Motors Corporation, Detroit, Mich.

[21] Appl. No.: 916,729

[22] Filed: Aug. 18, 1997

Related U.S. Patent Documents

Reissue of:

[64] Patent No.: 5,582,231
Issued: Dec. 10, 1996
Appl. No.: 431,923
Filed: Apr. 28, 1995

[51] Int. Cl.[6] ..... B22C 1/20

[52] U.S. Cl. ..... 164/525; 164/349; 106/38.4

[58] Field of Search ..... 164/525, 520, 164/349; 106/38.4, 137

[56] References Cited

U.S. PATENT DOCUMENTS

| | | | |
|---|---|---|---|
| 2,145,317 | 1/1939 | Salzberg | 22/188 |
| 2,206,369 | 7/1940 | Salzberg | 22/188 |
| 2,684,344 | 7/1954 | Phillips | 260/17.2 |
| 2,974,048 | 3/1961 | Sietsema | 106/38.5 |
| 2,974,050 | 3/1961 | Barlow | 106/38.5 |
| 3,166,808 | 1/1965 | Moore | 22/200 |
| 3,212,145 | 10/1965 | Green | 22/192 |
| 3,285,756 | 11/1966 | Moren et al. | 164/525 |
| 3,523,094 | 8/1970 | Roberts et al. | 260/17.2 |
| 4,098,859 | 7/1978 | Cummisford et al. | 264/122 |
| 4,500,453 | 2/1985 | Shank | 260/117 |
| 4,711,669 | 12/1987 | Paul et al. | 106/38.51 |
| 4,814,012 | 3/1989 | Paul et al. | 106/38.51 |
| 4,867,228 | 9/1989 | Novelli et al. | 164/525 |
| 4,900,361 | 2/1990 | Sachetto et al. | 106/137 |
| 5,014,763 | 5/1991 | Frank | 164/525 |
| 5,320,157 | 6/1994 | Siak et al. | 164/12 |

FOREIGN PATENT DOCUMENTS 221537 11/1986 European Pat. Off. .

*Primary Examiner*—Kuang Y. Lin
*Attorney, Agent, or Firm*—Lawrence B. Plant

[57] ABSTRACT

A foundry mold member made from a plurality of sand practice bound together with a binder which is concentrated at the contact points between contiguous particles and consists essentially of gelatins having a Bloom rating less than about 175 Bloom grams. The sand particles are first coated with a sol of the gelatin, cooled to ambient temperature and conditioned to prescribed water content necessary to effect migration of the gelatin to the interparticle contact points upon heating of the coated particles in a pattern mold.

33 Claims, 5 Drawing Sheets

SAND MOLD MEMBER AND METHOD

Matter enclosed in heavy brackets [ ] appears in the original patent but forms no part of this reissue specification; matter printed in italics indicates the additions made by reissue.

This invention relates to mold-making sand, mold members made therefrom, and a process for making same using select gelatins as a binder.

BACKGROUND

Molds for casting molten metals comprise several mold members working together to define the internal and external shape of the casting. Such members include core members for forming and shaping interior cavities in the casting, as well as cope/drag and shell members for forming and shaping the exterior of the casting. Such mold members are typically made by (1) mixing sand with a binder, (2) introducing (e.g., blowing) the binder-sand mix into a mold containing a pattern (hereinafter "pattern mold") for shaping the sand-binder mix to the desired shape for moving the metal casting, and (3) curing/hardening the binder in the pattern mold to harden the binder, and to fix the shape of the mold-forming material (i.e., sand-binder). A variety of synthetic resins are commonly used as binds in so-called "hot-box" and "cold-box" techniques for making such mold members, as is well known to those skilled in the foundry art.

Gelatin has been proposed as a binder for the sand. Heretofore, gelatins, without regard to Bloom ratings, have been used alone or in up to about a 50—50 admixture with certain crystallizeable carbohydrates (e.g., sugar), and baked to form binders for foundry sand—see Solzberg U.S. Pat. No. 2,145,317. Gelatin is desirable because it is water soluble, environmentally benign, and less costly than synthetic resins used in many sand-binder systems. Moreover, less heat is required to break the bonds of the gelatin's protein structure to thermally degrade the binder than is required for the synthetic resin binders. As a result, in the case of mold members which are cores, the gelatin binders break down readily from the heat of the molten metal, and thereby permit ready removal of the core sand from the casting with a minimum of additional processing (e.g., by shaking or hammering. Moreover, because the gelatin is water soluble, any and that is not removed from the casting mechanically, can readily be washed therefrom with hot water. Solubility of the gelatin also permits ready washing of the binder from the sand for recycling and reuse of the sand to make other mold members and thereby eliminate the cost of new sand.

Gelatin is a proteinaceous material obtained by the partial hydrolysis of collagen, the chief protein component of skin, bone, hides and white connective tissue of animals and is essentially a heterogeneous mixture of polypeptides comprising amino acids including primarily glycine, proline, hydroxyproline, alanine, and glutamic acid. Smaller amounts of other amino acids are also present. Gelatin is sold commercially as a by-product of the meat producing industry. So-called "dry" commercial gelatin actually has about 9% to about 12% by weight water entrained therein, and is an essentially tasteless, odorless, brittle solid having a specific gravity between about 1.3 and 1.4. Gelatins have a wide range of molecular weights varying from about 15,000 to above 250,000, but can be separated one from the other by suitable fractionation techniques known to those skilled in the art. Gelatins are classified, or grouped, into different categories known as "Bloom" ratings or "Bloom" numbers. The Bloom rating or number is determined by the Bloom test which is a system for rating the strength of gels formed from different gelatins. Gelatins having high Bloom ratings/numbers comprise generally polypeptides with higher average molecular weights than gelatins having lower Bloom ratings/numbers. The Bloom rating/number is determined by evaluating the strength of a gel formed from the gelatin. More specifically, a water solution consisting of 6.67% gelatin is prepared in a specified 150 ml, wide-mouth, glass bottle, which is chilled and held at 10°+/−0.1° C. for 17+/−1 hours before testing. After chilling, the rigidity of the gel is measured as the force, in grams, required to impress a standard 0.500+/−0.001 inch diameter plunger to a depth of 4 millimeters into the surface of the gel. This weight in grams is referred to as the Bloom rating or Bloom number of the particular gelatin tested. Commercial gelatins have a broad range of Bloom ratings ranging from about 50 Bloom grams to about 300 Bloom grams. Typically, the viscosity of the gelatin is measured at the name time as the Bloom rating by using the same gelatin sample as is used for the Bloom test. The sample is heated to 60° C. and 100 ml thereof placed in a calibrated capillary pipet. The eflux time from the pipet, in seconds, is recorded and later converted to millipoise. Hence, the viscosity of the gelatin is readily correlated to the Bloom rating, which viscosity is directly proportional to the Bloom number. That is to say, as the Bloom number increases so does the viscosity.

The present invention provides (1) a sand-based, mold-making material, (2) a mold member made therefrom, and (3) a process for manufacturing mold members from such material wherein certain low molecular weight gelatins are selected, and the water content thereof controlled during processing to (a) optimize the strength of the finished mold member while minimizing the gelatin content thereof, and (b) to provide a quick (i.e., within a few minutes) process for making a mold member using commercially available core-making equipment designed for use with resin-bonded sand. As used herein, the term "gelatin" refers to proteinaceous material itself even though fled "dry" gelatin as it is sold commercially includes about 9% to about 12% entrained water.

SUMMARY OF THE INVENTION

One aspect of the invention contemplates a foundry sand comprising a mass of sand particles each coated with a film of a binder consisting essentially of gel selected from the group consisting of gelatins having Bloom ratings of less than about 175 Bloom grams. The gelatins will preferably have Bloom ratings of at least about 65 Bloom grams. Most preferably, the gelatins will have Bloom ratings between about 75 and 150 Bloom grams. The binder preferably comprises about 0.5% to about 1.6% by weight of said mass. Higher concentrations (e.g., ca. 2% or more) of gelatin are possible, but only add to the cost without providing any offsetting benefit. At concentrations below about 0.5% by weight the mold members begin to weak to unacceptable levels. Extenders such as sugar and/or starch may be admixed with the gelatin, provided that they do not interfere with the ability of the gelatin to migrate to, and concentrate at, the interparticle contact points as discussed hereinafter. Additives may also be included with the gelatin to modify its properties. One such additive is the subject of U.S. Pat. No. 5,320,157 filed in the names of Siak et al, assigned to the assignee of the present invention, and involves the use of certain ferric compounds to promote better thermal degradation of the gelatin under low temperate casting conditions.

In another aspect of the invention, the invention contemplates a foundry mold member comprising a plurality of sand particles each bond to the next by the aforesaid gelatin concentrated at the contact points between contiguous sand particles. Still another aspect of the present invasion contemplates a method of making a mold member (e.g., core, cope, drag, shell, etc.) for shaping molten metal. A batch of hardenable mold-forming material is prepared which initially comprises (a) about 0.5% to about 1.6% by weight of gelatins having Bloom ratings less than about 175 Bloom grams, (b) sufficient water to form a sol of the gelatin upon heating, and (c) the balance principally sand particles. The mold-forming material is mixed at a suitable temperature to form an aqueous sol of the gelatin, and to coat the particles with such sol. The sol-coated particles are then cooled to about ambient temperature to gel the coating, and conditioned by having the moisture content of the gel adjusted to contain about 70% to about 85% (preferably about 76%) by weight total water (i.e., water entrained in the "dry" gelatin plus-added water). To shape the mold members, the conditioned particles are heated in a pattern mold in such a manner as to initially liquefy the gel on the surface of each of the particles, and then, under the influence of surface tension forces, cause the liquefied gel from each particle to migrate along the surfaces of the sand particles to contact points between contiguous sand particles where it concentrates and coalesces with the liquefied gel accumulated at such contact points from other sand particles. Finally, the sand is dried in the pattern mold to solidify and crystallize the gel sufficiently to harden the mold-forming material and form a mold member which is strong enough to handle and function as a mold member.

Preferably, the initial mold-forming mix will comprise about 2% to about 3% by weight water, and mixing will occur outside the pattern mold at temperature of about 85° C. to about 102° C. to coat the particles with a sol of the gelatin. Most preferably, the sand and water are both preheated to this temperature prior to adding the gelatin. The sol-coated particles will preferably then be cooled and conditioned (i.e., moisture adjusted) outside of the pattern-mold before they are introduced into the pattern mold. The particle slurry will then be introduced into the pattern mold, preferably by blowing, using conventional core-box filling/blowing techniques. Filling of the pattern mold will most preferably be done at ambient temperatures to prevent untoward drying of the mixture and to avoid the need for extraneous beating and handling equipment. The pattern mold will most preferably be preheated to a temperature of about 80° C. to about 120° C. prior to introducing the conditioned particles thereinto. Drying and crystallization of the gelatin in the mold-forming pattern will preferably be accomplished by passing a gas, such as dry air, through the particles.

The gel-coated particles will normally be used shortly after mixing, but, alternatively, may be dried after mixing and stored for use at a later time. In this latter alterative, the dried gelatin-coated sand is simply rewetted just before use (i.e., water is added back to the dry, gelatin-coated sand to condition the mix to the requisite water content).

DETAILED DESCRIPTION OF THE INVENTION

Figure 1:
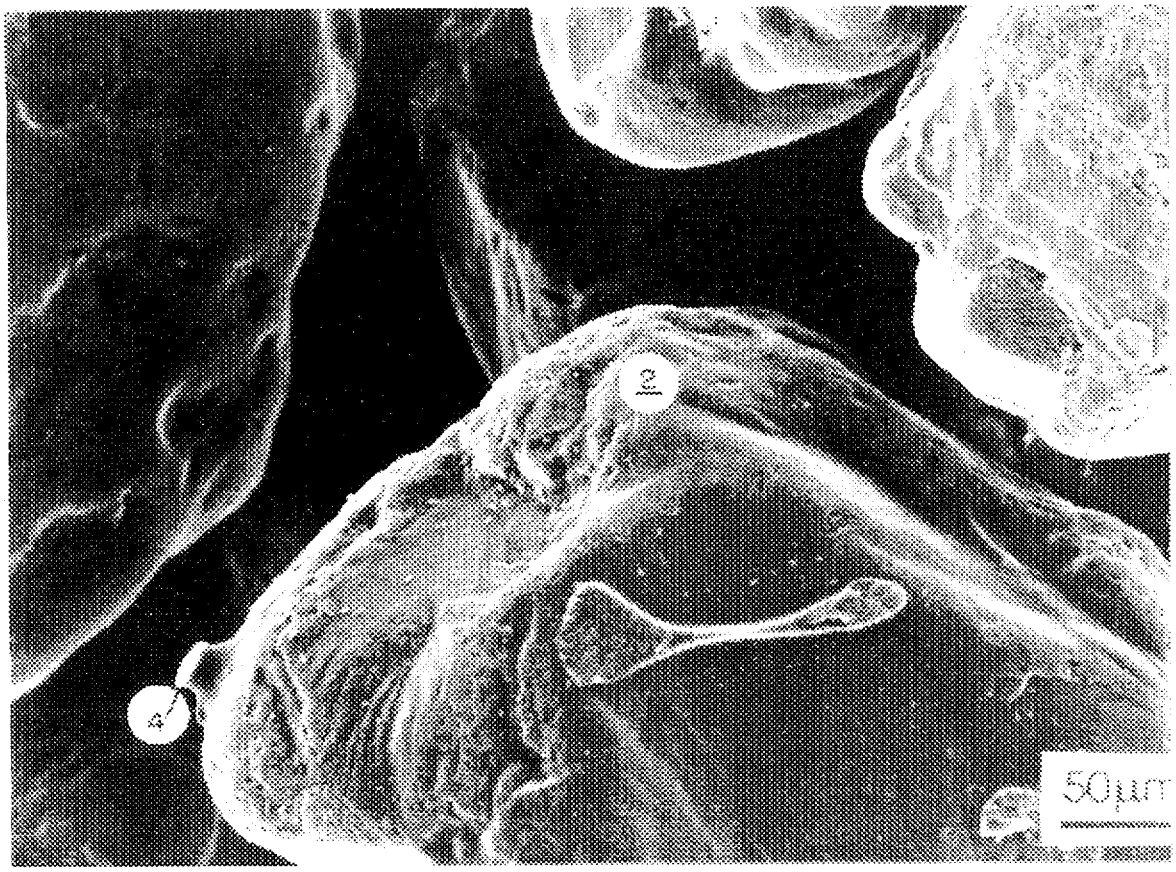
FIGS. 1–4 are various photomicrographs of sand particles bonded together by gelatin concentrated at the interparticle contact points, in accordance with the present invention

The present invention will better be understood when considered in the light of the following detailed description of certain specific embodiments thereof.

A sand mold member (e.g., core, cope drag, shell, etc.) is made by controlling the water content of a select group of gelatins which (1) have a viscosity and surface tension during processing which permit them to migrate along the surfaces of the sand particles to concentrate at the contact points between the particles, (2) harden sufficiently to provide a useful mold member, and (3) readily degrade at aluminum casting temperatures so that sand cores made therefrom can be readily removed from the innards of the casting. The select gelatins permit rapid processing into mold members utilizing essentially the same commercially available equipment as is used to manufacture resin-bonded sand or green sand molds, but modified for temperature and moisture control of the materials. Gelatin binders in accordance with the present invention are useful with all sands commonly used in the manufacture of foundry cores and molds, including lake sand, chromite sand, silica sand, Kyasill and zircon sand.

Binderwise, the invention involves the use of less than about 2% by weight (preferably about 0.5% to about 1.6%) of a select group of gelatins having Bloom ratings less than about 175 Bloom grams, and preferably between about 75 and about 150 Bloom grams. For cost and availability reasons, the Bloom rating should be at least about 65 Bloom grams. The selected gelatins are initially coated onto the surfaces of the individual sand particles, but subsequently migrate therefrom during processing. In this regard, when processed according to the method of the present invention, the gelatin-coated particles will form a mold member wherein the selected gelatins are concentrated at the points of contact between contiguous sand particles.

In accordance with the method aspect of the present invention, the sand particles are initially coated with the gelatin. This is readily accomplished by mixing the sand and gelatin together at an elevated temperature with sufficient water to form an aqueous sol of the gelatin at the mixing temperature, and to coat the particles with the sol. The order of mixing is not important. Hence, the water may be added to a pre-mix of gelatin and sand, or pre-moistened gelatin could be added to dry sand.

Following mixing, the coated particles are cooled to about ambient temperature to gel the sol, and conditioned such that the water content of the coating is adjusted to a specified amount of about 70% to about 85% by weight total water. The water content will preferably be about 76% by weight for an optimal combination of properties (e.g., gelatin viscosity and surface tension as well as particle flowability and dryability). At these water levels, the gel coating will re-liquefy when the particles are heated to a temperature of about 80° C. to about 120° C. in the pattern mold, and will have a viscosity which, under the influence of surface tension effects, allows it to migrate to the contact points between contiguous sand particles at such temperatures. Migration of the liquefied gel causes it to concentrate at the contact points between contiguous sand particles, and there to coalesce with the liquefied gel that has migrated to and accumulated thereat from other sand particles. Less than about 70% water yields a coating which is too viscous to migrate to the contact points, and results in a mold member which is not only weak but has a high percentage of the gelatin coring the sand particles in areas where no bonding occurs. Water contents in excess of about 85% by weight, on the other hand, results in a sand slurry which is too wet, heavy and bulky, to readily induce into the pattern mold. Moreover, excessive water not only reduces the final density of the dried mold member, but increases the time and energy required to subsequently dry the sand and recrystallize the gel in the pattern mold.

After the liquefied gel coating has migrated to, and concentrated/coalesced at the contact points, the sand is dried in the pattern mold to recrystallize and harden the gelatin. Drying to a water content level of about 5% to about 15% by weight total water is sufficient for most applications. For speed and simplicity sake, drying is preferably effected by passing a drying gas (e.g., dry air) through the porous bed of sand in the pattern mold. Other techniques such as heating, vacuum and/or freeze drying may be used in lieu of air drying, but are seen to be more complicated and expensive without and offsetting advantage. Following drying, the mold members is removed from the mold and is ready for use.

In accordance with a preferred embodiment of the aforesaid method, a batch of mold-forming material is formed outside of the pattern-forming mold by mixing together (a) ca. 0.5% to ca. 1.6% by weight of gelatins having Bloom ratings of about 75 to about 150 Bloom grams, (b) about 2% to about 3% by weight water, and (c) the balance essentially silica sand. Mixing is preferably accomplished in a vibratory, paddle, or screw mixer at a temperature of about 85° C. to about 102° C. for a sufficient time (e.g., about 60 seconds) to form a sol of the gelatin, and to coat the surfaces of the and particles with the sol. Both the water and the sand are preferably preheated to the mixing temperature prior to mixing with the gelatin.

After the sand has been coated, it is cooled to ambient temperature to gel the coating, and conditioned to adjust the total water content of the coating to between about 70% by weight and about 85% by weight. Depending on the circumstances, conditioning may be effected by drying (the normal situation), or by adding additional water as may be needed to achieve the desired water content in the mix. At the specified water content, the slurry of coated sand particles has good flowability for introducing it into the pattern mold using conventional core box blowing techniques. Too much water (i.e., more than about 85%), at this stage in the process, results in a heavy sand with poor flowability and handling characteristics for filling the pattern mold and too much water for economical removal. Too little water (i.e., less than about 70%), results in a gelatin coating which, when heated in the mold, is too viscous and has insufficient surface tension to migrate to the contact points between the particles as is required to produce the strongest mold member with the least amount of gelatin.

The properly conditioned material is then blown into the pattern mold at substantially ambient temperatures. Ambient temperature filling of the pattern mold (1) reduces the possibility that the conditioned material will prematurely dry out, and (2) eliminates the need for extra-cost energy and equipment. In this former regard, premature drying of the gel-coated sand causes it to become sticky, and increases the possibility of its clogging the equipment used to fill the pattern mold. More importantly, drying of the sand below about 70% water content results in the coating being too viscous to migrate to the interparticle contact points when the sand is heated in the pattern mold. The patter mold will preferably be preheated to a temperature of about 80° C. to about 120° C. before introducing the mold-forming material thereinto. Preheating of the mold shortens the overall time needed to complete the making of the mold members. In the pattern mold, conditioned sand is heated to a temperature of about 80° C. to about 120° C. for about 15 to 120 seconds to cause the gelatin on each sand particle to liquefy and migrate to the contact points between contiguous sand particles, where it concentrates and coalesces with the gelatin migrating thereto and accumulating thereat from other sand particles. Migration of the gelatin coating, and the concentration thereof at the contact points between the sand particles, accounts for the high strength that is obtainable with so little gelatin present. Hence, the present process concentrates the gelatin binder precisely when it is needed the most so that a minimal amount of gelatin is needed to produce a very strong core member.

After the gelatin has migrated to and coalesced at the interparticle contact points, the sand is dried so as to dehydrate the coalesced gel to a total water content level no greater than about 15% by weight. This hardens the mold member sufficiently that it is strong enough for handling and casting of metals. Drying is preferably accomplished by passing dry, compressed air through the moist sand bed at a pressure of about 15 to about 70 lbs/n$^2$ for about 15 to about 120 seconds. During the drying step, the coalesced gelatin at the contact points transforms physically from a sol to a gel and finally to a semicrystalline solid having about 60% to about 95% crystallinity. After the mold-making material has been so dried and recrystallized it is removed from the mold and suitable for use.

Figure 2:
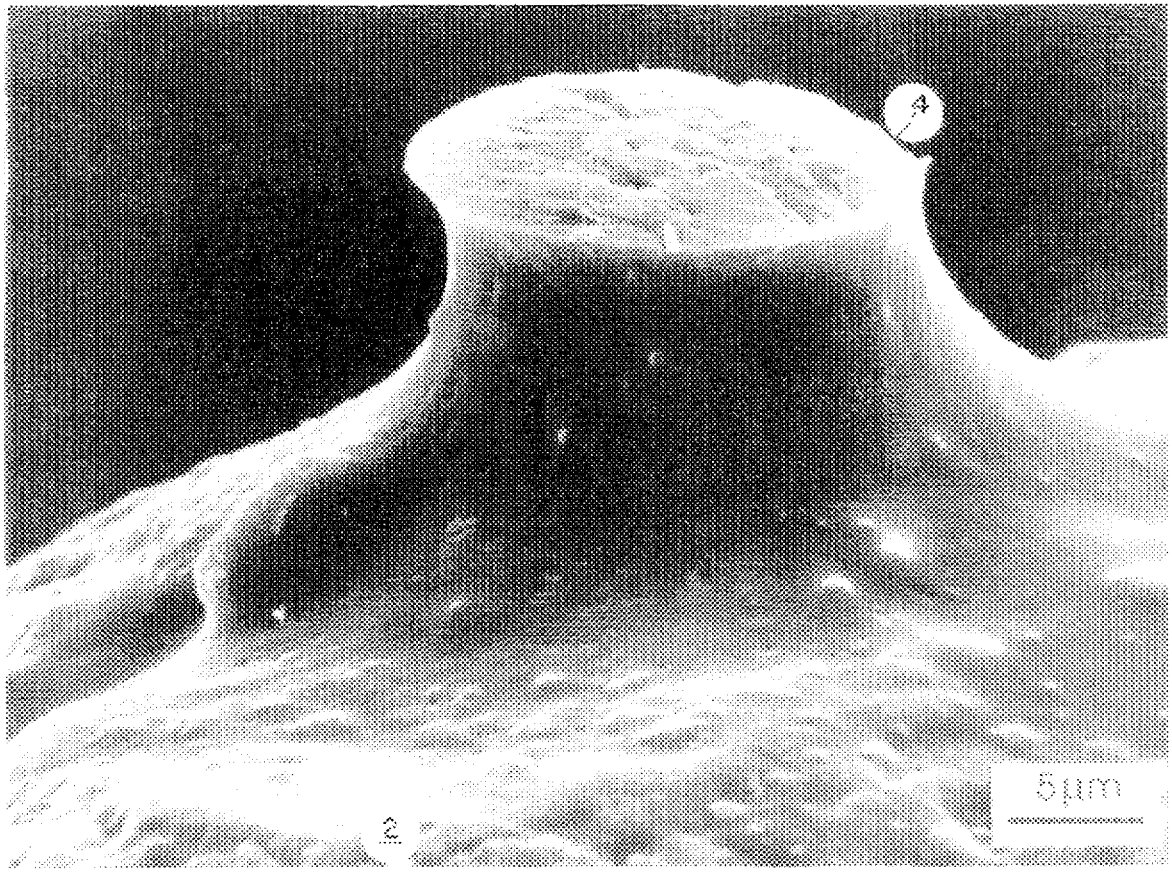
Figure 3:
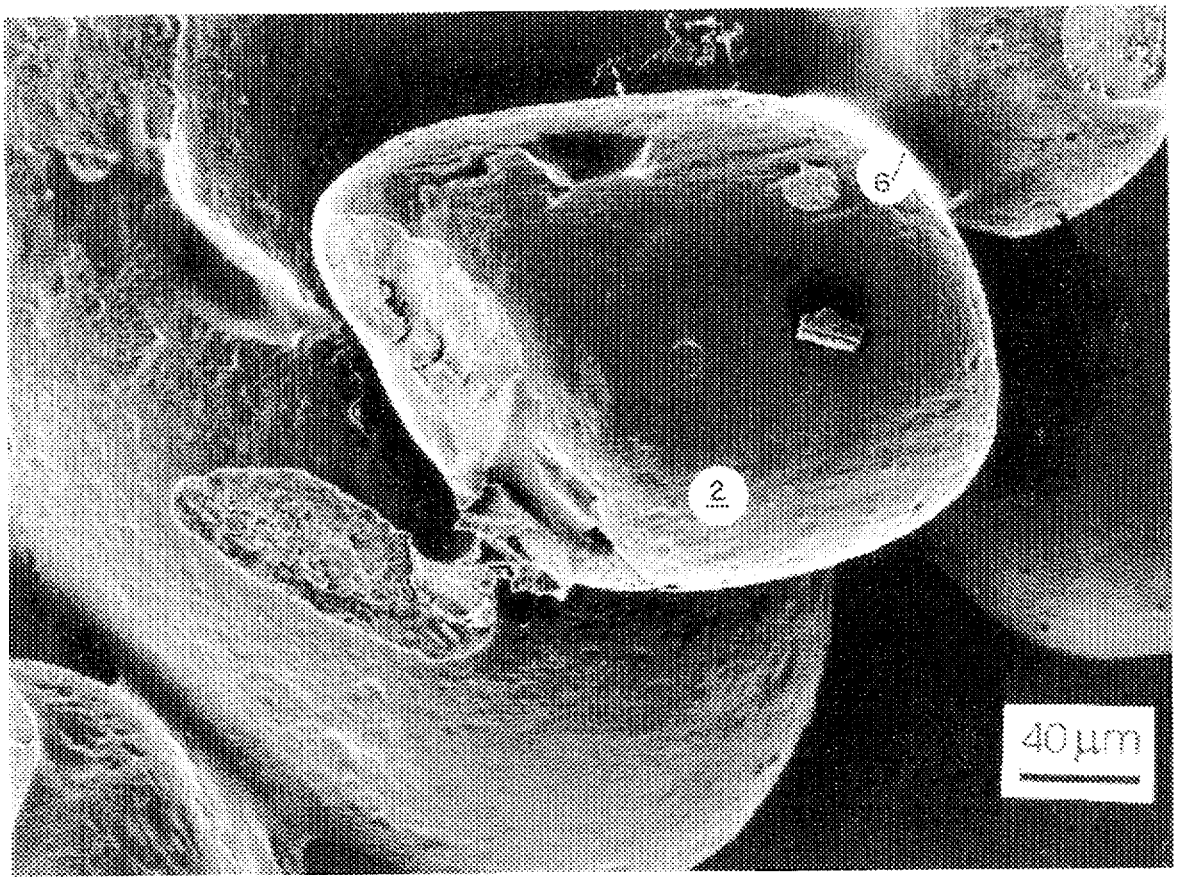
Figure 4:
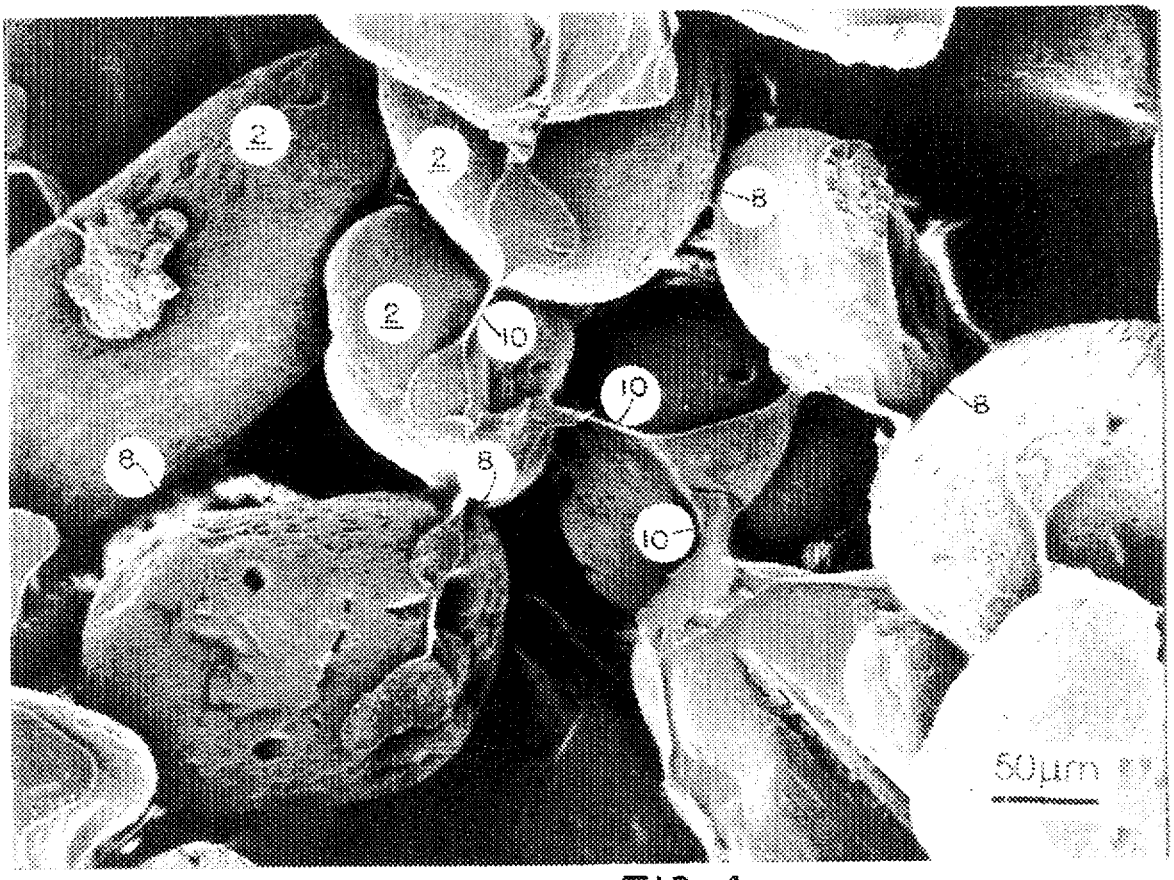

FIG. 1 is a SEM photomicrograph of a fractured mold member showing a sand grain 2 and a fractured glob of hardened gelatin 4 that had been attached to a contiguous grain of sand (not shown). FIG. 2 is an enlarged SEM photomicrograph of the glob 4 of FIG. 1 which shows the concentration of the gelatin at this site. FIG. 3 is a SEM photomicrograph showing several and grains 2 with a glob of hardened gelatin 6 intact holding the sand particles together. FIG. 4 is another SEM photomicrograph of a sand core member showing the gains of sand 2 and the gelatin bonds 8 therebetween. This micrograph shows the formation of gelatin filaments 10 which also serve to tie neighboring grains together.

Figure 5:
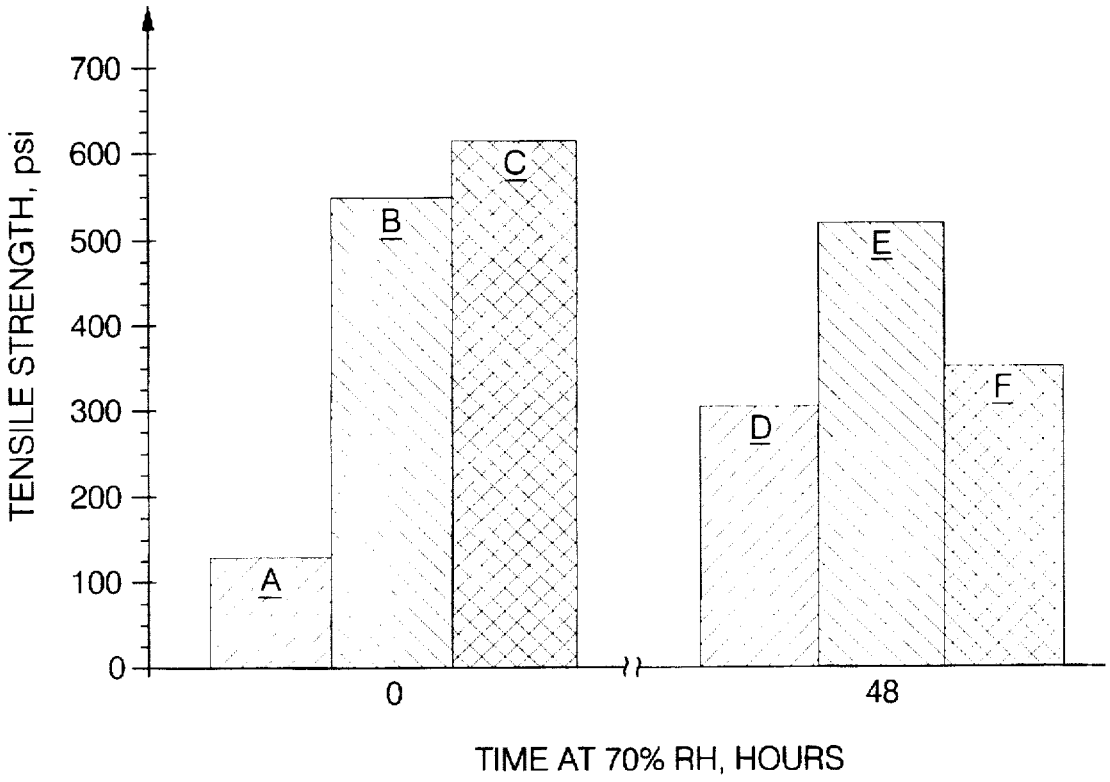
FIG. 5 is a bar graph reflecting the results of certain tests.

In some instances, it may be desirable to have a harder/stronger mold member then would result from the drying process described above. Additional strength hardness may be imparted to the mold member by further dehydration to a water content of less than about 10% by weight to crystalize the gelatin to a higher degree. Such further drying is conveniently effected by baking the core member after it has been removed from the pattern mold (though additional drying could be performed in the mold). Such baking may be accomplished by heating the core member to a temperature of about 100° C. for about 30 to 120 seconds (depending on the size of the mold member) in a radio frequency (RF) oven at about 20 MHz. Alternatively, the core member could be further dried and crystallized by means of dry forced air, or by microwaving at 2450 MHz for a period of about 2 to about 5 minutes at a power level of about 1 kilowatt/lb. of core member FIG. 5 shows the strength improvement that can be achieved under different post-molding, drying/heating conditions with a core comprising Kyasill® sand (a zircon sand mix sold by E. I. DuPont) having 1% by weight gelatin binds. The three bars on the left show the results of heating the mold members immediately after they leave the pattern mold. Bar (A) is the strength of an unheated sample (i.e., as-molded). Bar (B) is a sample like that used to produce bar (A) but which has been heated for one (1) minute in an RF oven, and bar (C) is a similar sample heated at 93° C. for 24 hours in a convection oven. The three bars on the right show the results of heating the mold members after they were removed from the pattern mold and allowed to stand for 48 hours at room temperature and 70% relative humidity before testing. Bar (D) is the strength of the mold member unheated, but 48 hours drier then when it left the pattern mold. The bar (E) sample was heated in an RF oven for one (1) minute and the bar (E) sample was heated for 24 hours in a convection oven at 93° C. Drying for 24 hours in a convection oven (i.e., sample F) provided only slight strength improvement. It is significant to note that RF oven drying significantly improves the strength of both the as-molded sample (B) and 48 hour-70% RH-treated sample (E). In this regard, it is believed that RF heating raises the temperature of the gelatin much higher than 93° F. which results in thermal cross-linking of the gelatin for added strength improvement. Microwave heating will produce the same effects as RF heating for the same reason.

After removal from the pattern mold, or post baking if used, the mold member may be further treated if desirable or necessary. For example, the member may be coated with a refractory material to improve its performance, as is known to those skilled in the art. In addition, so as to prevent atmospheric humidity from degrading the member, it may be coated with a nonwater soluble, and preferably biodegradable, polymer such as poly(β-hydroxyalkynoates) or chitosan, as well as others, to improve the member's shelf life.

Gelatins having Bloom ratings less than about 75 Bloom grams, while effective, are limited in supply, and unnecessary. Gelatins having Bloom ratings greater than about 175 Bloom grams result in mold-forming materials which are often too stiff for good working especially in colder weather. Gelatins in the Bloom rating range of about 75 to about 150 Bloom grams are seen to be the most economicial, and the best all-weather gelatins which readily break down under low melt-temperature conditions yet provide a sufficiently strong mold member.

A particular advantage of mold members made in accordance with the present invention is that if a member is flawed for any reason (e.g., cracked or broken) it may simply be reground to a suitable particle size, and rehydrated as discussed above for reuse in the manufacture of additional mold members.

A number of processing alternatives are possible within the intent of the invention. For example, rather than mixing the sand, water and gelatin outside of the pattern mold, mixing could be effected within the pattern mold by filling the mold with dry, uncoated sand, and then flooding the sand in the mold with a hot, dilute gelatin solution. Excess solution is drained off, and the wet sand dehydrated with flowing air to condition the gelatin to the requisite water content. Moreover, gel-coated sand could be conditioned in the pattern mold itself. In this regard, cool but unconditioned gel-coated sand is blown into the mold, and then dry or moist air, as needed, is passed therethrough while it is in the pattern mold to adjust the water content to the level needed to insure gelatin migration to the microparticle contact points upon heating. Finally, drying of the coated sand in the pattern mold may alternatively be effected by heating, freeze drying or vacuum drying.

In still another alternative embodiment, the coated sand will be dried and stored prior to the conditioning step. In this regard, a supplier of coated sand would simply coat the sand with gelatin, dry it to substantially equilibrium with the ambient or less, and package it for shipment to a user (i.e., core-maker). The user would then simply rewet the coated sand and pick up the process of the present invention beginning at the "conditioning" step. Coated sand thus produced would comprise a plurality of sand particles each having a coating thereon consisting essentially of gelatins having a Bloom rating of less than about 175 Bloom grams wherein the coating comprises about 0.5% by weight to about 2.0% by weight of the coated sand. Preferably, the mass will comprise gelatins having Bloom ratings between about 75 and 150 Bloom grams and the coating will comprise about 0.5% to 1.6% by weight of the coated sand.

While the invention has been described primarily in terms of certain specific embodiments thereof, it is not intended to be limited thereto but rather only to the extent set forth hereafter in the claims which follow.

What is claimed is:

1. A method of making a mold member for shaping molten metal [cash] *cage* thereagainst, comprising the steps of:

a. preparing a batch of coated and particles coated with an aqueous sol comprising water and sufficient gelatin to bind sand particles together upon drying, said gelatin consisting essentially of gelatins having a Bloom rating less than about 175 [grams] *Bloom*;

b. cooling the coated and particles sufficiently to gelatinize said sol as coating of gel on said sand particles;

c. conditioning the coated sand particles to provide conditioned sand particles having a water content in said gel between about 70% to about 85% by [volume] *weight*;

d. heating the conditioned sand particles in a mold sufficiently to (1) liquefy said gel and cause it to migrate along the surface of the sand particles and concentrate at contact points between contiguous said sand particles, and (2) there to coalesce with liquefied gel accumulated at said contact points; and e. drying the liquefied gel in said mold to crystallize and harden said gel at said contact points sufficiently to form said mold member.

2. A method according to claim 1 wherein said gelatin has a Bloom rating between about 75 and 150 Bloom grams.

3. A method according to claim 1 wherein initially said gelatin comprises about 0.5% to about 1.6% by weight and said water comprises about 2% to about 3% by weight of said coated sand.

4. A method according to claim 1 including the steps of drying and storing said coated sand particles before said conditioning.

5. A method according to claim 1 comprising drying said gel concentrated at said contact points by passing a drying gas through said particles.

6. A method according to claim 1 comprising drying said gel concentrated at said contact points by subjecting said particles to a vacuum while they are still in said mold.

7. A method according to claim 1 wherein said gelatins have a Bloom rating of at least about 65 Bloom grams.

8. A method according to claim 7 wherein said gelatins have a Bloom rating between about 75 and about 150 Bloom grams.

9. A method according to claim 1 comprising drying said gel sufficiently to form a semicrystalline gelatin binder having a water content of about 10% by weight to about 15% by weight.

10. A method according to claim 9 including the step of dehydrating said gel to a water content less than about 10% by weight.

11. A method according to claim 1 wherein said batch is prepared by mixing said sand, gelatin and water outside of said mold at a mixing temperature between about 85° C. and about 102° C.

12. A method according to claim 11 including the step of preheating said sand to about said mixing temperature before said mixing.

13. A method according to claim 12 including the step of preheating said water to at least about 85° C. before said mixing.

14. A method according to claim 1 including the step of conditioning said coated sand particles outside of said mold.

15. A method according to claim 14 including the step of introducing said conditioned sand particles into said mold at substantially ambient temperature.

16. A method according to claim 15 including the step of preheating said mold to a temperature of about 80° C. to about 120° C. prior to introducing the conditioned particles into said mold.

17. A method according to claim 15 comprising blowing said conditioned particles into said mold.

18. A method of making a mold member comprising the steps of:

a. coating a plurality of sand particles with an aqueous sol of gelatin at a coating temperature of about 85° C. to about 102° C., said gelatin comprising about 0.5% to about 1.6% by weight of the coated particles and consisting essentially of gelatins having a Bloom rating less than about 175 Bloom grams;

b. cooling the coated sand particles go about ambient temperature to provide a coating of gel on said particles;

c. conditioning the coated sand particles to provide conditioned sand particles having a moisture content of between about 70% to about 85% by weight water in the coating thereon;

d. introducing the conditioned sand particles into a pattern mold at about ambient temperature to shape said particles into the shape of said mold member;

e. heating the conditioned sand particles in said pattern mold sufficiently to liquefy said coating and cause it to migrate along the surfaces of the sand particles to become concentrated at, and coalesce at, contact points between contiguous said particles; and f. drying the sand particles in said pattern mold to crystallize and harden said gel at said contact points.

19. A method according to claim 18 wherein said gelatin is in the [bloom] *Bloom* range of about 65 to about 150 *Bloom grams*.

20. A method according to claim 18 including the step of subjecting said sand particles to a vacuum in said pattern mold to dry said sand particles.

21. A method according to claim 18 including the step of preheating said mold to a temperature of about 80° C. to about 120° C. prior to introducing the conditioned sand particles thereinto.

22. A method according to claim 21 comprising blowing said conditioned sand particles into said pattern mold.

23. A method according to claim 18 wherein said coating step includes preheating said sand particles to about said coating temperature before adding said gelatin.

24. A method according to claim 23 including the step of preheating said water to about said coating temperature before adding it to said sand particles.

25. A method according to claim 18 including the step of passing a gas through said particles in said pattern mold to dry said liquefied gel.

26. A method according to claim 25 wherein said gas is air.

27. A method according to claim 18 wherein said drying is sufficient to dehydrate said liquefied gel to a water content between about 10% to about 15% by weight.

28. A method according to claim 27 including, following said drying in said pattern mold, dehydrating said sand particles to a water content less than about 10% by weight.

29. A method according to claim 28 wherein said dehydrating is effected by baking said sand particles outside of said pattern mold to further harden said gel.

30. A method according to claim 29 wherein said baking is effected at a temperature of at least about 93° C. at ambient pressure.

31. A foundry mold member comprising a plurality of sand particles each bound to the next by a binder which (1) is concentrated at contact points between contiguous said particles, (2) consists essentially of gelatins having a Bloom rating less than about 175 Bloom grams, and (3) is present in an amount between about 0.5% to about 1.6% by weight of said member.

32. A foundry mold member according to claim 31 wherein said gelatin has a Bloom rating of at least about 65 Bloom grams.

33. A foundry mold member according to claim 32 wherein said gelatin is selected from the group of gelatins having a Bloom rating range of about 75 to about 150 Bloom grams.

* * * * *